US007807595B2

United States Patent
Nguyen et al.

(10) Patent No.: US 7,807,595 B2
(45) Date of Patent: Oct. 5, 2010

(54) LOW LOSS CHALCOGENIDE GLASS FIBER

(75) Inventors: Vinh Q Nguyen, Fairfax, VA (US); Jasbinder S Sanghera, Ashburn, VA (US); Ishwar D Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/183,095

(22) Filed: Jul. 31, 2008

(65) Prior Publication Data

US 2008/0287278 A1 Nov. 20, 2008

Related U.S. Application Data

(62) Division of application No. 10/824,836, filed on Apr. 15, 2004, now Pat. No. 7,418,835.

(51) Int. Cl.
C03C 3/32 (2006.01)
C03C 13/04 (2006.01)

(52) U.S. Cl. .......................... 501/37; 501/40
(58) Field of Classification Search .................. 501/37, 501/40
See application file for complete search history.

(56) References Cited

U.S. PATENT DOCUMENTS

| | | | | | |
|---|---|---|---|---|---|
| 3,177,082 A | * | 4/1965 | MacAvoy | ..................... | 501/40 |
| 3,209,641 A | * | 10/1965 | Upton | ........................ | 385/142 |
| 3,901,996 A | * | 8/1975 | Hasegawa et al. | ........... | 428/426 |
| 4,154,503 A | * | 5/1979 | Lettington et al. | .......... | 385/142 |

(Continued)

FOREIGN PATENT DOCUMENTS

JP 58220103 * 12/1983

(Continued)

OTHER PUBLICATIONS

Machine translation of JP 06051138, Feb. 1994.*

(Continued)

*Primary Examiner*—Karl E Group
(74) *Attorney, Agent, or Firm*—Amy L. Ressing; Joseph T. Grunkemeyer

(57) ABSTRACT

This invention pertains to a chalcogenide glass of low optical loss that can be on the order of 30 dB/km or lower, and to a process for preparing the chalcogenide glass. The process includes the steps of optionally preparing arsenic monochalcogenide precursor or the precursor can be provided beforehand; dynamically distilling the precursor in an open system under vacuum from a hot section to a cold section to purify same; homogenizing the precursor in a closed system so that it is of a uniform color; disposing the distilled or purified precursor and at least one chalcogenide element at a hot section of an open distillation system; dynamically distilling under vacuum in an open system so that the precursor and the at least one chalcogenide element are deposited at a cold section of the open system in a more purified state; homogenizing the precursor and the at least chalcogenide element in a closed system while converting the precursor and the at least one chalcogenide element from crystalline phase to glassy phase.

8 Claims, 3 Drawing Sheets

U.S. PATENT DOCUMENTS

| | | | | |
|---|---|---|---|---|
| 4,183,617 | A * | 1/1980 | Isaacs et al. | 385/130 |
| 4,439,464 | A * | 3/1984 | Lauks | 427/76 |
| 4,493,886 | A * | 1/1985 | Lauks | 430/270.1 |
| 4,920,078 | A * | 4/1990 | Bagley et al. | 438/779 |
| 5,735,927 | A * | 4/1998 | Sanghera et al. | 65/389 |
| 5,779,757 | A | 7/1998 | Sanghera et al. | |
| 5,958,103 | A * | 9/1999 | Yoneda et al. | 65/385 |
| 6,074,968 | A * | 6/2000 | Yoneda et al. | 501/35 |
| 6,277,775 | B1 * | 8/2001 | Aitken | 501/40 |
| 6,503,859 | B1 * | 1/2003 | Aitken | 501/40 |
| 6,756,333 | B2 * | 6/2004 | Aitken | 501/40 |
| 6,984,598 | B1 * | 1/2006 | Hilton, II | 501/37 |
| 7,116,888 | B1 * | 10/2006 | Aitken et al. | 385/147 |
| 7,143,609 | B2 * | 12/2006 | Aitken et al. | 65/26 |
| 7,330,634 | B2 * | 2/2008 | Aitken et al. | 385/147 |

FOREIGN PATENT DOCUMENTS

| | | | |
|---|---|---|---|
| JP | 62240908 | * | 10/1987 |
| JP | 06051138 | * | 2/1994 |
| JP | 02275732 | * | 11/1999 |

OTHER PUBLICATIONS

Asobe et al "Third-order nonlinear spectroscopy in As2S3 Chalcogenide Glass Fibers", J. Appl. Physics, 77(11), Jun. 1995.*

Nguyen et al., "Fabrication of Arsenic Sulfide Optical Fiber with Low Hydrogen Impurities" J. Am. Ceram. Soc., 85 [8] 2056-58 (2002).

Nguyen et al., "Fabrication of Arsenic Selenide Optical Fiber with Low Hydrogen Impurities" J. Am. Ceram. Soc., 85 [11] 2849-51 (2002).

Kanamori et al., "Chalcogenide Glass Fibers for Mid-Infrared Transmission" J. Lightwave Technol., LT-2, 607-613 (1984).

* cited by examiner

LOW LOSS CHALCOGENIDE GLASS FIBER

This application is a divisional application of U.S. patent application Ser. No. 10/824,836, filed on Apr. 15, 2004, now U.S. Pat. No. 7,418,835, incorporated herein by reference.

FIELD OF THE INVENTION

This invention pertains to a process for making chalcogenide waveguides and to low loss chalcogenide glass waveguides, including chalcogenide glass fibers, produced thereby.

DESCRIPTION OF RELATED ART

Silica and fluoride optical fibers have a limited usage beyond 2 μm and 3 μm, respectively, since these fibers exhibit significant multiphonon absorption. On the other hand, chalcogenide glasses transmit to beyond 12 μm in the infrared (IR).

The IR transmitting chalcogenide glasses and optical fibers encompass the IR region of interest with numerous applications including thermal imaging, temperature monitoring, and medical applications, including high energy IR laser power delivery such as CO (5.4 μm) and $CO_2$ (10.6 μm) lasers. In addition, these fibers are being developed for remote fiber optic chemical sensor systems for military and industrial facility clean-up and other military and industrial applications. More recently, there is an interest in developing rare-earth doped chalcogenide fibers for 1.3 μm fiber amplifiers for telecommunications as well as sources in the IR.

To date, the conventional process for making the chalcogenide glasses is to use elemental precursor, such as arsenic, and a chalcogenide, such as sulfur, batched in a sealed silica ampule. The conventional process involves high temperature of greater than about 750° required for melting and homogenization of the elemental arsenic and sulfur. The high temperature melting/homogenization process causes the precursor arsenic and sulfur to react with the silica ampule thus introducing undesired contamination into the glass and fiber. Contamination reduces fiber strength and contributes to additional extrinsic scattering loss in the fiber.

Therefore, there is a need for a new approach to melt and homogenize the arsenic and sulfur, or their counterparts, at lower temperatures. The objective of this invention is to make arsenic monosulfide compound, or its counterpart, at lower temperatures, typically between 350° C. and 400° C. The attractive properties of arsenic monosulfide ($A_4S_4$), or another counterpart, include low melting point and low chemical activity. Because the stable arsenic monosulfide compound, or its counterpart, has a low chemical activity, by adding appropriate amount of sulfur, or another chalcogenide, the arsenic monosulfide and sulfur precursors, or their counterparts, can be dynamically distilled at a lower temperature, such as between 420° C. and 450° C., and remelted and homogenized at a lower temperature, such as 600° C. This eliminates reaction between arsenic and sulfur, or their counterparts with the silica ampule.

The Russian patent with a filing number of 4808456/33 was filed Apr. 2, 1990, and discloses a process for making a chalcogenide glass fiber that can be used for transmission of laser energy in applications such as laser surgery, in making instruments for industrial diagnosis of electronic devices, and the like. The object of the process is reduction of optical losses which is achieved by using arsenic monosulfide ($As_4S_4$) in place of arsenic and sulfur to make chalcogenide glass and glass waveguides, such as glass fibers. In a particular embodiment disclosed by the Russian patent noted above, about 600 g arsenic monosulfide was evaporated in a closed ampule under pressure at 550° C. of which about 540 g of purified arsenic monosulfide was deposited at the cold end of the ampule following which, 81 g of sulfur was added to the 540 g of the arsenic monosulfide in the ampule and the mixture was melted and reacted at 550° C. for 10 hours in a sealed ampule. Rate of evaporation of the mixture was $0.9 \times 10^{-3}$ $g/cm^2$-s and glass fibers were drawn from the glass prepared as described, which had optical loss of 40-100 dB/km in the 2-8 μm wavelength region when the evaporation/distillation rate was $(0.8-1.0) \times 10^{-3}$ $g/cm^2$-sec and varied greatly at distillation rates slightly above or slightly below the $(0.8-1.0) \times 10^{-3}$ $g/cm^2$-sec.

OBJECTS AND BRIEF SUMMARY OF THE INVENTION

An object of this invention is a chalcogenide glass and a process for preparing chalcogenide glass that has lower optical loss than any known prior art chalcogenide glass.

Another object of this invention is the use of arsenic monosulfide precursor, or another corresponding chalcogenide precursor, for making chalcogenide glass which precursor is more stable and less reactive with silica.

Another object of this invention is the use of dynamic or open distillation characterized by an open system wherein distillation rate is many times that of corresponding rate in a closed system.

Another object of this invention is the lack of impurity entrainment in connection with distillation in dynamic distillation that is characterized by high distillation rates that are typically conducive to entrainment of impurities.

Another object of this invention is multiple purification of arsenic monosulfide, or another arsenic monochalcogenide by dynamic distillation under a vacuum.

Another object of this invention is multiple color homogenization of arsenic monosulfide, or another corresponding arsenic monochalcogenide precursor.

Another object of this invention is the preparation of highly pure chalcogenide glasses and waveguides, including chalcogenide glass fibers and planar waveguides, quicker and at lower cost which is essentially due to high dynamic distillation rate.

These and other objects of this invention can be accomplished by using an open dynamic distillation system wherein arsenic monosulfide, or another corresponding arsenic monochalcogenide are distilled and reacted to form a chalcogenide glass and used to fabricate a chalcogenide waveguide that can have optical loss below about 30 dB/km.

DETAILED DESCRIPTION OF THE INVENTION

Figure 1:
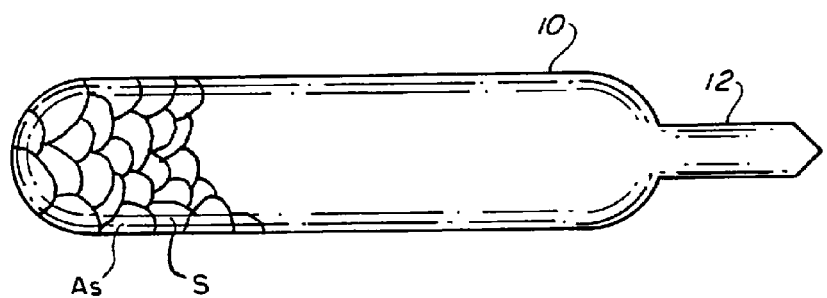
FIG. 1 is a schematic representation of preparation of arsenic monosulfide from arsenic and sulfur in a closed system.

This invention pertains to chalcogenide glass or waveguide and to a process for its preparation. The process includes an optional step for preparing an arsenic monochalcogenide precursor followed by purification distillation of the precursor in an open system, adding a chalcogenide element to the precursor after distillation, distilling and reacting the chalcogenide and the precursor to remove residue and waste gaseous substances, such as $H_2S$ and $OH^-$ species, and homogenizing the precursor and the chalcogenide to form the glass. As used herein, the term "waveguiide" defines any device that is designed to confine and direct the propagation of electromagnetic waves and includes "glass fibers." Furthermore, the term "chalcogenide" includes compounds and chalcogen elements.

The chalcogenide waveguide produced by the herein disclosed process includes chalcogenide glass that comprises at least one of the chalcogen elements sulfur (S), selenium (Se) and tellurium (Te) and typically at least one of Ge, Sb, In, Cl, Br, F and I. Chalcogenide glass typically contains at least 25 mole %, and more typically at least 50 mole % of one or more of the three chalcogen elements, typically sulfur or selenium, especially sulfur, and less than about 90 mole %, and typically less than about 80 mole %.

The glass systems in the chalcogenide glasses of most significance are the As—S as As—Se systems. In the As—S binary system, arsenic content can vary from about 7 mole % to about 40 mole % and sulfur content can vary from about 93 mole % to about 60 mole %, and binary arsenic-sulfur systems can vary in molar compositions from $As_7S_{93}$ to $As_{40}S_{60}$. For the binary system of As—Se, arsenic content can vary from 55.9 mole % to 0.1 mole % and selenium content can vary from 44.1 mole % to 99.9 mole %, and the arsenic selenide system can vary in molar compositions from $As_{55.9}Se_{44.1}$ to $As_{0.1}Se_{99.9}$. For the As—S glasses, the chalcogenide precursor is arsenic monosulfide ($As_4S_4$) and for the As—Se glasses, the chalcogen precursor is arsenic monoselenide ($As_4Se_4$).

Although binary chalcogen systems have been discussed above, it should be understood that systems with more than two components are envisioned. Ternary systems with arsenic, sulfur and selenium, such as $As_{50}S_{49}Se_1$, have been found suitable for purposes herein. The ternary systems include $As_{50}S_1Se_{49}$ to $As_{50}S_{49}Se_1$. These compounds are essentially equivalent for purposes herein and it should be noted that the similarity of these compounds is apparently fostered by the fact that sulfur and selenium are in Group IIB of the Periodic Table and are of more or less the same size and are similar in chemical behavior. The tellurium atom is much larger and its glass forming region with arsenic is much smaller and thus provides a limited composition range than the As—S and As—Se glasses. Since glass fibers are a principal application for the chalcogenide glasses disclosed herein, typically ternary core and clad compositions, which are crystalline initially include $As_{40}S_{55}Se_5$ for the core and $As_{40}S_{60}$ for the clad; $As_{40}S_{55}Se_5$ for the core and $As_{40}S_{57.5}Se_{2.5}$ for the clad.

The characteristics of a suitable chalcogenide precursor include stability and inertness.

Chalcogenide precursors are used because they can be produced by reacting the components at a lower temperature at which the components are relatively unreactive with silica glass or whatever other glass of the glass ampule, in which the chalcogenide precursors are prepared.

The chalcogenide glass fibers made pursuant to the process disclosed herein have high strength of up to about 10 kpsi and higher, have optical loss of about 30 dB/km or lower and are suitable for a panoply of applications, including thermal imaging, temperature monitoring, medical applications and high IR energy power delivery systems using lasers including CO lasers operating at 5.4 μm and $CO_2$ lasers operating at 10.6 μm. In addition, such fibers can be used in fiber optic chemical sensors for military and commercial facility cleanup, as rare-earth doped fibers for fiber amplifiers, Raman amplifiers and all optical ultra-fast switches for telecommunications. In reference to the use fibers in the ultra-fast switching, present telecom signals have speed of about 2 gbits/sec but some telecom systems operate at higher speeds of 10 gbits/sec and specialty systems operate at speeds of 40 gbits/sec. At this point, the ultimate speed objective is greater than 100 gbits/sec at which speed, each pulse is about 10 ps. In switching, the objective is to change polarization of light quickly enough for it to be re-directed. The change made electooptically, even in lithium niobate, is not quick enough to change RI in a material to enable re-direction of a pulse for 100 Gbits/s. If changing of the RI with a burst of energy is not quick enough, then re-direction or switching is made whereby it will not be possible to re-direct a single pulse because it is traveling through a glass fiber very fast but what will be re-directed will be many pulses. So, an ultra-fast switch provides selectivity whereby a single or a select few pulses can be re-directed. It is the chalcogenide waveguides prepared pursuant to the process disclosed herein that can make possible the ultra-fast switching.

As used herein, distillation in open and closed systems refers to dynamic distillation under vacuum in an open system where vaporous contaminants are free to escape whereas in a closed system, contaminants are not free to escape but are confined.

Although other chalcogenide systems are contemplated herein, a particular embodiment will be exemplified in connection with the As—S system.

Having described the invention, the following example is given as a particular embodiment thereof and to demonstrate the practice and advantages thereof. It is understood that the example is given by way of illustration and is not intended to limit the specification or claims in any manner.

The initial process step of making arsenic monosulfide ($As_4S_4$) precursor is optional since the precursor can be purchased and its preparation can be thus avoided. When purchased, its purity will be low, which can be upgraded by known refining process. However, when it is desired to prepare the pure precursor, it can be accomplished by batching 280.12 grams of arsenic and 119.88 grams of sulfur, which is 1/1 molar ratio, in a clean silica ampule 10, see FIG. 1. Arsenic is of a gray color and sulfur is yellow. Ampule 10 in FIG. 1 also has a closed neck 12 through which vaporous residue or contaminants are removed from interior of the ampule with the open neck. For purposes herein, the ampule was 24" in longitudinal extent with the neck length of 4" and its diameter was 6 mm. Interior diameter of the ampule was 2" and its thickness was 2 mm. The ampule containing the chemicals was evacuated for 6 hours at $1 \times 10^{-5}$ Torr vacuum and then sealed using a methane/oxygen torch, as shown in FIG. 1. The closed system ampule containing the arsenic and sulfur was melted and reacted at 350-450° C., particularly 370° C. inside a furnace for 24 hours and then slowly cooled to room temperature. The ampule was placed into a nitrogen gas filled glove box and 400 grams of crystalline arsenic monosulfide compound was retrieved from the ampule. The arsenic monosulfide compound was of a uniform orange color.

Figure 2:
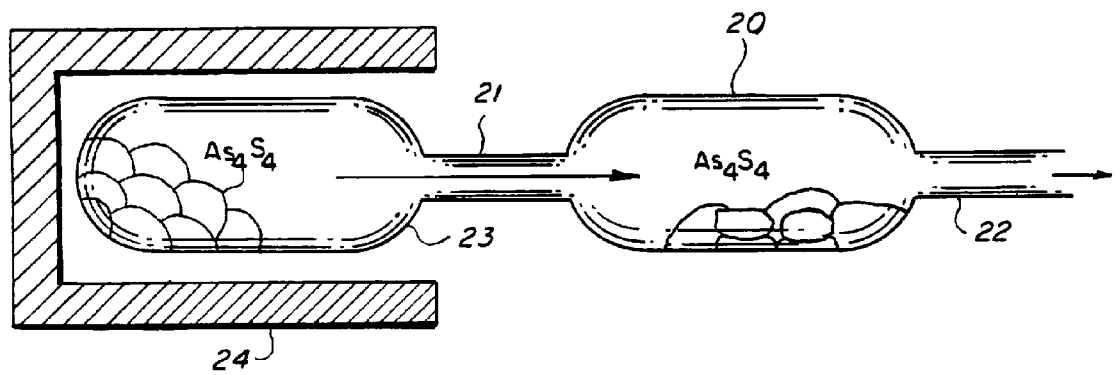
FIG. 2 is schematic representation of dynamic distillation of arsenic monosulfide in an open system.
Figure 3:
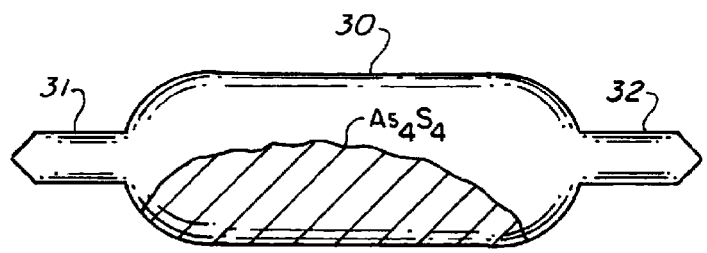
FIG. 3 is a schematic representation of arsenic monosulfide homogenization in a closed system.

The 400 grams of the arsenic monosulfide compound from FIG. 1 was loaded into the left portion of another ampule 20 for purification, see FIG. 2, through tube 20 and reduced neck 21 into tube 23. Ampule 20 had similar dimensions to the ampule in FIG. 1 except its neck 22 was open. The open system ampule 22 containing the arsenic monosulfide compound was placed into furnace 24 at room temperature and dynamically distilled under vacuum of $1 \times 10^{-5}$ Torr for 3 hours to remove inert nitrogen gas. Only the part containing the $As_4S_4$ (tube 23) was placed within furnace 24, as schematically shown in FIG. 2. Following removal of the inert nitrogen gas with vacuum, the furnace temperature was increased from room temperature to 420° C. at a rate of 10° C./min and held at 420° C. for 6 hours while dynamically distilling the arsenic monosulfide compound at a rate of $65.6 \times 10^{-3}$ g/cm²-sec from the hot left portion of the ampule to its right cold portion. Trace amount of a black residue remained behind at the left portion of the ampule shown in FIG. 2. In FIG. 2, the arsenic monosulfide was distilled from left side (tube 23), where its color was uniform orange before distillation, to the right side of the ampule into tube 20, where its color was non-uniform or variegated ranging from deep or dark red to yellow after distillation. Approximately 400 grams of the arsenic monosulfide compound was collected in the cold or the right portion of the ampule (tube 20), as shown in FIG. 2, and the ampule was then sealed by closing necks 21 and 22 with a torch, which necks then became closed necks 31 and 32, respectively 32, of FIG. 3, and the compound was remelted for homogenization purposes by heating at 370° C. for 5 hours, as shown in FIG. 3. In FIG. 3, ampule 30, is a portion of ampule 20, is only a partial ampule, incorporating only the right portion of ampule 20, and necks 31 and 32 correspond to the open necks 21 and 22 except in FIG. 3, the necks are closed. Before homogenization, the arsenic monosulfide is non-uniform red/yellow whereas it is of a uniform orange color after homogenization. Ampule 30, with its closed neck 32, was placed inside a nitrogen glove box and then the homogenized arsenic monosulfide was removed from silica ampule 30 without contamination.

Figure 4:
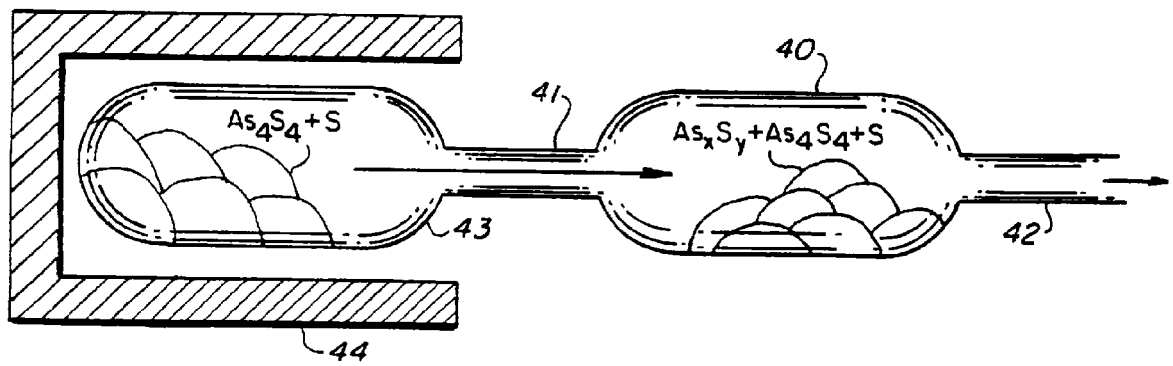
FIG. 4 is a schematic representation of distillation and reaction of arsenic monosulfide with sulfur in an open system to make arsenic sulfide glass.

Then, 34.216 grams of the homogenized arsenic monosulfide precursor by passing through reduced neck 42, through tube 40 and then through reduced neck 41 and into tube 43, from the closed ampule 30 and 5.784 grams of sulfur, for a total of 40 grams, were batched in silica ampule 43, see FIG. 4, to make $As_{39}S_{61}$, that was used to make a core of a glass fiber. Silica glass ampule 40 also had open neck 42 of reduced cross-section and connecting tube 41. Ampule 40 had same dimensions as ampules 10 in FIG. 1 and ampule 20 in FIG. 2 and whereas ampules 10 and 20 were the same, ampule 40 was different. As shown in FIG. 4, sulfur and the purified and homogenized arsenic monosulfide were deposited at the left portion of the ampule (tube 43) which was disposed in furnace 44. The compound at the left portion of FIG. 4 was the homogenized compound of FIG. 3 in a crystalline form of a uniform orange color. The compound and sulfur in the left portion of ampule 40, was then placed within the furnace, as described, and dynamically distilled at room temperature for 3 hours at $1 \times 10^{-5}$ Torr vacuum. The furnace temperature was increased from room temperature to 450° C. at a rate of about 10° C./min and held at 450° C. for one hour. While in the left portion of ampule 40, at 450° C. and in the furnace, the precursor and sulfur were distilled for one hour at a vacuum of $1 \times 10^{-5}$ Torr at a rate of $500\text{-}1500 \times 10^{-3}$ g/cm²-sec, typically about $900 \times 10^{-3}$ g/cm²-sec, particularly $980 \times 10^{-3}$ g/cm²-sec, whereby the vaporous compound and sulfur deposited at the cold, room temperature right portion of ampule 40, as shown in FIG. 4, where the arsenic monosulfide and sulfur were still in mostly separate crystalline phases but included some glassy phases of As and S. It is here that additional materials can be added and distilled together with arsenic monosulfide and sulfur. Also, a sulfur compound can be used in total or partial replacement of the elemental sulfur.

Figure 5:
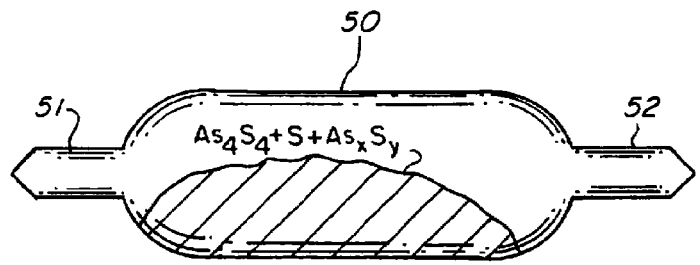
FIG. 5 is a schematic representation of homogenization of crystalline arsenic monosulfide and elemental crystalline sulfur to form chalcogenide glass, either $As_{39}S_{61}$ or $As_{38}S_{62}$.

After distillation from ampule 43, arsenic monosulfide compound and sulfur were disposed in ampule 40 and only black residue remained in the left portion after distillation. After distillation, the distillate in was in ampule 40 was in a mixture of a non-uniform variegated color ranging from dark red to yellow. Ampule 40 was then cooled to room temperature and connecting tube 41 and neck 42 sealed with a methane/oxygen torch and ampule 40 was removed and is denoted as ampule 50 and closed necks 51 and 52, corresponding to necks 41 and 42, as shown in FIG. 5. Ampule 50, containing the arsenic monosulfide compound and sulfur mixture of a non-uniform red/yellow color, containing mostly crystalline arsenic monosulfide compound and crystalline sulfur, was homogenized by remelting and reacting the mixture at a temperature of 350-450° C., typically above 450° C., and particularly at 600° C. for 8 hours, or until color of resulting product becomes uniform, following which, 40 grams of a glassy $As_{39}S_{61}$ was obtained, that was used to make a core of a glass fiber. In FIGS. 4 and 5, $As_xS_y$ denote a multitude of by-product phases present after distillation.

Conversion from crystalline state to glassy state took place above 550° C. during homogenization and reaction of the distilled arsenic monosulfide and sulfur and it is during homogenization and reaction, when temperature was raised above 550° C. at a rate of 10° C./min, reaction of arsenic monosulfide and sulfur and the phase transformation from crystalline to glassy took place.

Following homogenization and reaction, the furnace temperature was lowered to 400° C. and ampule 50 was quenched in room temperature water for about 3 seconds. 1-inch diameter glass cullet of composition $As_{39}S_{61}$ was obtained from the silica ampule 50 having optical loss of 30 dB/km.

In a similar manner, 67.267 grams of arsenic monosulfide and 12.733 grams of sulfur were used to make 80 grams of a 1-inch diameter glass cullet of clad composition $As_{38}S_{62}$. Arsenic monosulfide and sulfur were dynamically distilled at a rate of about $980 \times 10^{-3}$ g/cm²-sec.

Figure 6:
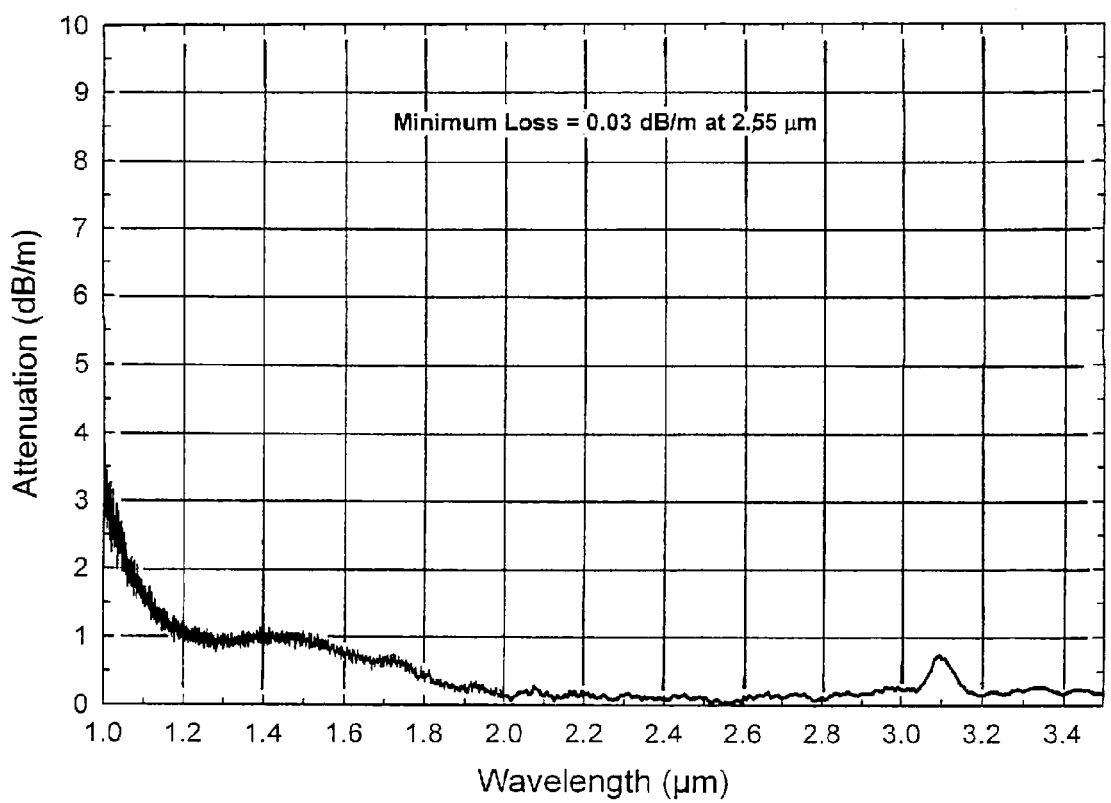
FIG. 6 is a graph showing optical attenuation of a core-clad arsenic sulfide optical fiber with a loss close to zero.

FIG. 6 shows optical attenuation of a 20-meter long arsenic sulfide glass fiber that was prepared in the manner described above. Minimum optical loss is a record low value of 30 dB/km at 2.55 μm.

The new process disclosed above has the following advantages over a conventional process with respect to preparation of the As—S glass:

1. The arsenic monosulfide compound can be synthesized and homogenized at a low temperature between 350° C. and 400° C. and distilled at a low temperature of between 400° C. and 450° C.;

2. Lower distillation temperature of about 450° C. can be achieved due to open system dynamic distillation at a high vacuum whereas conventional closed system requires a higher temperature;

3. Dynamic distillation increases distillation rate about 1000 times over the conventional, which is an immense advantage in commercial operations;

4. The melting and homogenization of the glass melt, as in FIG. 5, can be carried out at a lower temperature of 600° C. compared to a temperature greater than 750° C. for a conventional process;

5. The arsenic monosulfide is a stable component;

6. Lower homogenization and reaction temperature of 600° C. and chemical stability of arsenic monosulfide compound eliminate chemical reaction between arsenic and sulfur with the silica ampule.

7. Following the process disclosed herein reduces light scattering significantly in long glass fiber lengths resulting in high strength and low optical loss glass fibers with greater flexibility;

8. The arsenic monosulfide and sulfur can be sublimed/distilled at a lower temperature which minimizes entrainment of particulate matter, thus producing higher optical quality glass and glass fibers.

Specifically with respect to the Russian patent bearing the filing number 4808456/33, advantages of the herein-disclosed process include:

1. An unexpectedly higher rate of distillation without expected higher glass contamination;

2. Use of a higher vacuum:

3. Dynamic vacuum distillation: and

4. Much lower temperature of distillation which makes possible avoidance of a contaminating reaction.

It was thought that more particles would be entrained at higher distillation rates and therefore, would negatively impact purity of the resulting glass. However, surprisingly and unexpectedly, this did not turn out to be so.

While presently preferred embodiments have been shown of the novel chalcogenide waveguides, including glass fibers, and process for making same, and of the several modifications discussed, persons skilled in this art will readily appreciate that various additional changes and modifications may be made without departing from the spirit of the invention as defined and differentiated by the following claims.

What is claimed is:

1. An arsenic sulfide glass made by a process comprising:
   placing arsenic monosulfide in a glass receptacle;
   distilling under vacuum the arsenic monosulfide to make purified arsenic monosulfide;
   homogenizing the purified arsenic monosulfide;
   adding sulfur to the purified arsenic mono sulfide;
   distilling under vacuum in an open distillation system the purified arsenic monosulfide with the sulfur to form distilled arsenic monosulfide and sulfur;
   sealing the open distillation system; and
   reacting and homogenizing the distilled arsenic monosulfide and sulfur to form the arsenic sulfide glass;
      wherein the molar concentration of arsenic and sulfur varies from $As_7S_{93}$ to $As_{40}S_{60}$;
      wherein the glass is in the form of a fiber; and
      wherein the fiber consists of arsenic, sulfur, and optionally, one or more of germanium, antimony, indium, chlorine, bromine, fluorine, and iodine;
      wherein the optical loss of the arsenic sulfide glass is about 30 dB/km or lower at 2.55 μm.

2. The arsenic sulfide glass of claim 1;
   wherein the distilling of the arsenic monosulfide and the sulfur is carried out at a distillation rate of 500-1500× $10^{-3}$ g/cm²-sec; and
   wherein the reacting and homogenizing of the distilled arsenic monosulfide and sulfur results in the arsenic sulfide glass having uniform color.

3. The arsenic sulfide glass of claim 2 wherein the distilling of the arsenic monosulfide and the sulfur is carried out at a distillation rate of about above 900×$10^{-3}$ g/cm²-sec.

4. The arsenic sulfide glass of claim 2 wherein the reacting and homogenizing of the distilled arsenic monosulfide and sulfur is carried out by heating the distilled arsenic monosulfide and sulfur at a temperature above about 450° C. until the color of the arsenic sulfide glass becomes uniform.

5. The arsenic sulfide glass of claim 2, wherein the process further comprises:
   reacting arsenic and sulfur to form arsenic monosulfide.

6. The arsenic sulfide glass of claim 5 wherein the reacting of arsenic and sulfur is carried out at a temperature of about 350° C. to about 450° C. until arsenic monosulfide is formed.

7. The arsenic sulfide glass of claim 1, wherein the distilling of the arsenic monosulfide and the sulfur is carried out at a temperature below 550° C.

8. The arsenic sulfide glass of claim 1, wherein the fiber consists of arsenic, sulfur, and optionally, one or more of indium, chlorine, bromine, fluorine, and iodine.

* * * * *